US008452178B2

(12) United States Patent
Gao et al.

(10) Patent No.: US 8,452,178 B2
(45) Date of Patent: *May 28, 2013

(54) PASSIVE OPTICAL NETWORK USER TERMINAL AND METHOD OF POWER SUPPLY CONTROL AND POWER SUPPLY STATE REPORTING FOR THE SAME

(75) Inventors: Hai Gao, Munich (DE); Yinghu Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,918

(22) Filed: Oct. 11, 2011

(65) Prior Publication Data

US 2012/0027411 A1   Feb. 2, 2012

Related U.S. Application Data

(63) Continuation of application No. 11/612,319, filed on Dec. 18, 2006, now Pat. No. 8,073,329.

(30) Foreign Application Priority Data

Dec. 20, 2005  (CN) .......................... 2005 1 0120786
May 17, 2006  (CN) .......................... 2006 1 0082274

(51) Int. Cl.
*H04J 14/00* (2006.01)
*H04L 12/56* (2006.01)

(52) U.S. Cl.
USPC .................. 398/66; 398/67; 398/71; 398/72; 725/129; 725/130

(58) Field of Classification Search
USPC ..................................... 398/66, 43
See application file for complete search history.

(56) References Cited

U.S. PATENT DOCUMENTS 5,396,635 A   3/1995 Fung
5,504,606 A   4/1996 Frigo (Continued)

FOREIGN PATENT DOCUMENTS

CN   100438505 C   11/2008
EP   0644704 A2   3/1995

(Continued)

OTHER PUBLICATIONS

Office Action issued in U.S. Appl. No. 11/612,319, mailed Aug. 21, 2009.

(Continued)

*Primary Examiner* — Shi K Li
*Assistant Examiner* — Oommen Jacob
(74) *Attorney, Agent, or Firm* — Brinks Hofer Gilson & Lione

(57) ABSTRACT

The present disclosure discloses a passive optical network (PON) user terminal comprising a passive optical network interface unit (PONIU) having access to a PON system, a service data distribution unit (SDDU) connected to the PONIU for distributing service data, a plurality of service processing units (SPUs) for receiving and accordingly processing the service data distributed by the SDDU, a power source for providing power to the above units, and a power supply control unit (PSCU) for controlling the activating/deactivating of the energy-saving power supply to the SPUs, the SDDU, and the PONIU. The present disclosure further provides a method for controlling the PON power supply and for reporting the power supply state. The present disclosure allows control of the energy usage of the PON user terminal to save power when a service in the PON user terminal is not used or when the user terminal uses a backup power source to supply power.

18 Claims, 3 Drawing Sheets

PON user teminal  OLT

PON power supply state change alert message

PON power supply state change response message

U.S. PATENT DOCUMENTS

| | | | |
|---|---|---|---|
| 5,825,862 | A | 10/1998 | Voit et al. |
| 6,023,467 | A | 2/2000 | Abdelhamid et al. |
| 6,178,447 | B1 | 1/2001 | Wannenmacher et al. |
| 6,785,754 | B1 | 8/2004 | Chao-Li et al. |
| 7,028,195 | B2 | 4/2006 | Kasprzak et al. |
| 7,073,075 | B2 | 7/2006 | Freyman et al. |
| 7,237,133 | B2 | 6/2007 | Aoki |
| 7,389,528 | B1 * | 6/2008 | Beser .............................. 725/111 |
| 7,391,299 | B2 | 6/2008 | Bender et al. |
| 7,500,261 | B1 * | 3/2009 | Myers ............................ 725/105 |
| 7,587,746 | B1 | 9/2009 | Schwartzman et al. |
| 7,672,591 | B2 | 3/2010 | Soto et al. |
| 8,073,329 | B2 * | 12/2011 | Gao et al. ......................... 398/66 |
| 2002/0090909 | A1 | 7/2002 | Dapper et al. |
| 2003/0123648 | A1 | 7/2003 | Ashton et al. |
| 2003/0137982 | A1 | 7/2003 | Sala et al. |
| 2003/0202655 | A1 | 10/2003 | Nattkemper et al. |
| 2003/0227798 | A1 | 12/2003 | Pax |
| 2004/0017911 | A1 | 1/2004 | Nattkemper |
| 2004/0172657 | A1 | 9/2004 | Phillips et al. |
| 2004/0213286 | A1 | 10/2004 | Jette et al. |
| 2004/0247316 | A1 * | 12/2004 | Soto et al. ......................... 398/47 |
| 2005/0105913 | A1 | 5/2005 | Ozeki et al. |
| 2005/0175035 | A1 | 8/2005 | Neely et al. |
| 2005/0177755 | A1 | 8/2005 | Fung |
| 2005/0229226 | A1 * | 10/2005 | Relan et al. ..................... 725/114 |
| 2006/0029389 | A1 * | 2/2006 | Cleary et al. ..................... 398/33 |
| 2006/0053309 | A1 * | 3/2006 | Vereen et al. ................. 713/300 |
| 2006/0184811 | A1 | 8/2006 | Kasprzak |
| 2006/0187071 | A1 | 8/2006 | Kortum et al. |
| 2006/0188090 | A1 | 8/2006 | Paulsen et al. |
| 2006/0188266 | A1 | 8/2006 | Vrla et al. |
| 2006/0291493 | A1 * | 12/2006 | Schley-May et al. ......... 370/401 |
| 2007/0274716 | A1 | 11/2007 | Ying et al. |
| 2008/0159744 | A1 | 7/2008 | Soto et al. |
| 2009/0074423 | A1 | 3/2009 | Bernard et al. |
| 2009/0212971 | A1 | 8/2009 | Casey et al. |
| 2012/0027411 | A1 | 2/2012 | Gao et al. |

FOREIGN PATENT DOCUMENTS

| | | |
|---|---|---|
| EP | 0973088 | 1/2000 |
| JP | 2003-209920 A | 7/2003 |
| WO | 02/33853 A1 | 4/2002 |

OTHER PUBLICATIONS

Office Action issued in U.S. Appl. No. 11/612,319, mailed Dec. 9, 2009.

Office Action issued in U.S. Appl. No. 11/612,319, mailed Mar. 5, 2010.

Office Action issued in U.S. Appl. No. 11/612,319, mailed Aug. 6, 2010.

Office Action issued in U.S. Appl. No. 11/612,319, mailed Dec. 7, 2010.

Office Action issued in U.S. Appl. No. 11/612,319, mailed Apr. 13, 2011.

Notice of Allowance issued in U.S. Appl. No. 11/612,319, mailed Aug. 10, 2011.

Office Action issued in corresponding Chinese Patent Application No. 200780000390.3, mailed Mar. 31, 2012.

Chinese Office Action for Chinese Publication No. 2006100822745, 5 pages, file dated stamped Feb. 15, 2008.

Foreign Communication from related application, Search Report, EP 1801984 A1, dated Apr. 13, 2007, 3 pages.

Draft Amendment to—Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Media Access Control Parameters, Physical Layers and Management Parameters for Subscriber Access Networks, IEEE Draft P8021.3ah/D3.2 (Mar. 22, 2004).

Foreign communication from a counterpart application—European application 06026490.0, Office Action dated Mar. 27, 2009, 6 pages.

Foreign communication from a counterpart application—European application 06026490.0, Office Action dated Nov. 11, 2010, 6 pages.

Kennedy, "DP83848—Single 10/100 Mb/s Ethernet Transceiver Energy Detect Mode," National Semiconductor Corporation, Sep. 2005, 3 pages.

PCT International Search Report; PCT/CN2007/070024; Mailing Date: Sep. 13, 2007, 5 pages.

PCT Written Opinion; PCT/CN2007/070024; Mailing Date: Sep. 13, 2007, 4 pages.

* cited by examiner

# PASSIVE OPTICAL NETWORK USER TERMINAL AND METHOD OF POWER SUPPLY CONTROL AND POWER SUPPLY STATE REPORTING FOR THE SAME

CROSS-REFERENCE TO RELATED APPLICATIONS

This application is a continuation of U.S. application Ser. No. 11/612,319, filed on Dec. 18, 2006, which claims priorities to Chinese Patent Application No. 200610082274.5, filed on May 17, 2006, and Chinese Patent Application No. 200510120786.1, filed on Dec. 20, 2005. The afore-mentioned patent applications are hereby incorporated by reference in their entireties.

BACKGROUND

The present disclosure relates to the Passive optical network (PON) technology, and more particularly to a PON user terminal, and a method of power supply control and power supply state reporting for the user terminal.

PON technology is an optical access technology developed to support point-to-multipoint applications. Referring to FIG. 1, a PON typically comprises an optical line terminal (OLT) residing in the central office, a plurality of user terminal equipment residing in the user premises, which are typically optical network units (ONUs) or optical network terminals (ONTs), and an optical distribution network (ODN). The ODN comprises optical fiber and a passive optical network divider or coupler, and is located between the OLT and the user terminal equipment. The PON technology features all passive ODN components, a passive optical network divider and coupler serving only as an optical delivery and limiting means, no need for power supply and message processing, unlimited mean time between failures (MTBF), a flexible deployment of network due to its passive nature, and no need for room or power for equipment. The technology also features shared optical fiber, making possible significantly reduced optical fiber resources, which in turn leads to less expensive network access lines, a pure optical medium architecture, and a transparent optical fiber bandwidth network, putting the technology on the safe side for future service expansion.

In a PON, the optical fiber medium is used for data transmission, and the significantly improved bandwidth capacity over conventional technologies, such as copper cable and wireless Local Area Networks (LANs), allows for development of various services. The services that may be transmitted over a PON in the future include, for example, data access services, voice service, digital video service such as internet protocol television (IPTV), video on demand, conventional video services such as cable television and digital television, security data, and utility meter reading links to residential users. Incorporation of various service processing units (SPUs) into the PON user terminals may result in increased power consumption. Therefore, there is a need for saving the power consumed by such PON user terminals. Further, since some services require high reliability, the PON user terminal may be equipped with a backup battery so that it can rely on the backup battery for power supply if there is an outage in the alternating current (AC) main power supply, in which case saving the power consumed by the PON user terminal is particularly important.

SUMMARY

The embodiment of the present disclosure provides a passive optical network user terminal and a power supply control and state reporting method for such user terminal. The methods allows control of the energy usage of the passive optical network user terminal to save power when a service in the passive optical network user terminal is not used or when the user terminal uses a backup power source to supply power.

A PON user terminal of the embodiment of the present disclosure comprises:

a passive optical network interface unit (PONIU) having access to a PON system;

a service data distribution unit (SDDU) connected to the PONIU for distributing service data;

a plurality of SPUs for receiving and accordingly processing the service data distributed by the SDDU; and a power source for providing power to each of these units.

The PON user terminal further comprises:

a power supply control unit (PSCU) for controlling the activating and/or deactivating of the energy-saving power supply to the SPUs, the SDDU, and the PONIU.

Optionally, the PSCU may comprise:

a service state checking unit for checking the usage state of each SPU; and a first control unit, which, upon determining that a SPU is not in use based on the result of the SPU state checking, activates the energy-saving power supply to the SPU and deactivates the energy-saving power supply to the SPU if it detects that the SPU is needed again.

Optionally, the PSCU may further comprise:

a second control unit, which, upon determining that all SPUs are not in use based on the result of state checking of each SPU, activates the energy-saving power supply to all SPUs, the PONIU, and the SDDU and, upon detecting that any SPUs are needed, deactivates the energy-saving power supply to the needed SPUs, the PONIU, and the SDDU.

The power source may include the main power source and a backup power source, and the PSCU may comprise:

a power supply state checking unit for checking power supply state; and a third control unit, which, upon determining that the main power source is disconnected and the backup power source is providing power based on the result of the power supply state checking, chooses to activate the energy-saving power supply to some or all of the SPUs.

Optionally, the PSCU may further comprise:

a fourth control unit, which, upon determining that the backup power source drops to a preset level based on the result of power supply state checking, chooses to activate the energy-saving power supply to some or all of the SPUs.

The SPUs may comprise a video SPU, a voice SPU, and a data access SPU.

The energy-saving power supply may disconnect or decrease the power supply.

Accordingly, the embodiment of the present disclosure provides a method for controlling power supply to the PON user terminal, wherein the PON user terminal comprises a PONIU, a SDDU, and a plurality of SPUs, comprising:

checking the usage state of each SPU;

activating, upon deciding that a SPU is not in use based on the result of the SPU state checking, the energy-saving power supply to the SPU, and activating the energy-saving power supply to the SPU once detecting that the SPU is needed again.

The method may further comprise:

activating, upon determining that not all SPUs are in use based on the result of the SPU state checking, the energy-saving power supply to all SPUs, PONIU, and SDDU and,` activating, upon detecting that any SPUs are needed, the energy-saving power supply to the needed SPUs, PONIU, and SDDU.

The SPUs may comprise a video SPU, a voice SPU, and a data access SPU.

The energy-saving power supply may disconnect or decrease the power supply.

Accordingly, the present disclosure provides a method for reporting the state of the power supply to the PON user terminal, comprising:

the PON user terminal sending a message to an OLT to alert the latter of the power supply state change of the PON user terminal unit.

The message of the power supply state change of the PON user terminal unit may comprises information on the operation of entering or exiting from energy-saving power supply mode as well as a PON user terminal unit identifier indicating the operation of entering or exiting from energy-saving power supply mode.

The optional OLT may accordingly returns a message to the PON user terminal as a response to the alert message of the power supply state change of the PON user terminal unit.

The message responding to the alert message of the power supply state change of the PON user terminal unit may comprise accepting or refusing the power supply state change of the PON user terminal unit, and accepting or rejecting the identifier of the PON user terminal unit whose power supply state has been changed.

Wherein the optional OLT does not return a response message to the PON user terminal, but records the state change of the PON user terminal unit power supply.

The PON user terminal unit may comprise a plurality of SPUs, a PONIU, and a SDDU.

The energy-saving power supply may disconnect or decrease the power supply.

Compared with the prior art, the embodiment of the present disclosure has the following benefits:

First, by setting a PSCU in the PON user terminal, the embodiment of the present disclosure allows activation of the energy-saving power supply to the SPUs, SDDU, or PONIU within the PON user terminal through the PSCU in the event that the PON user does not use a service in the user terminal equipment. The present disclosure also allows activation of the energy-saving power supply to the SPUs, SDDU, or PONIU through the PSCU upon detecting the resumption of the service, thereby significantly reducing the power consumed by the equipment. Secondly, the embodiment of the present disclosure enables the user to extend the time that the backup power source is able to support critical services by giving up some other services, that is, by activating the energy-saving power supply to some of the SPUs, SDDU, or PONIU in the event that the PON user terminal equipment has a backup power source. Thirdly, the embodiment of the present disclosure also allows the PON user terminal to send an alert message to the OLT informing the latter of the state change of its power supply, wherein the OLT accordingly returns a message to the PON user terminal as a response to the alert message. This allows that the operator at the office end to enhance his ability to maintain and manage the user terminal equipment by sending a message in a specific format, and to improve the maintenance efficiency and quality of service by early detection of any signs of a developing fault in the user terminal equipment, for example, a disconnection in the equipment main power supply.

DETAILED DESCRIPTION

Figure 1:
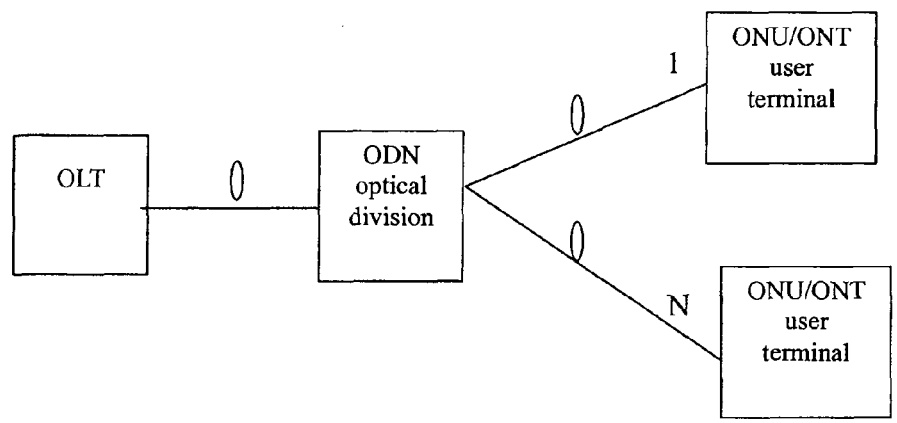
FIG. 1 is a schematic drawing illustrating the composition of one embodiment of a PON system.
Figure 2:
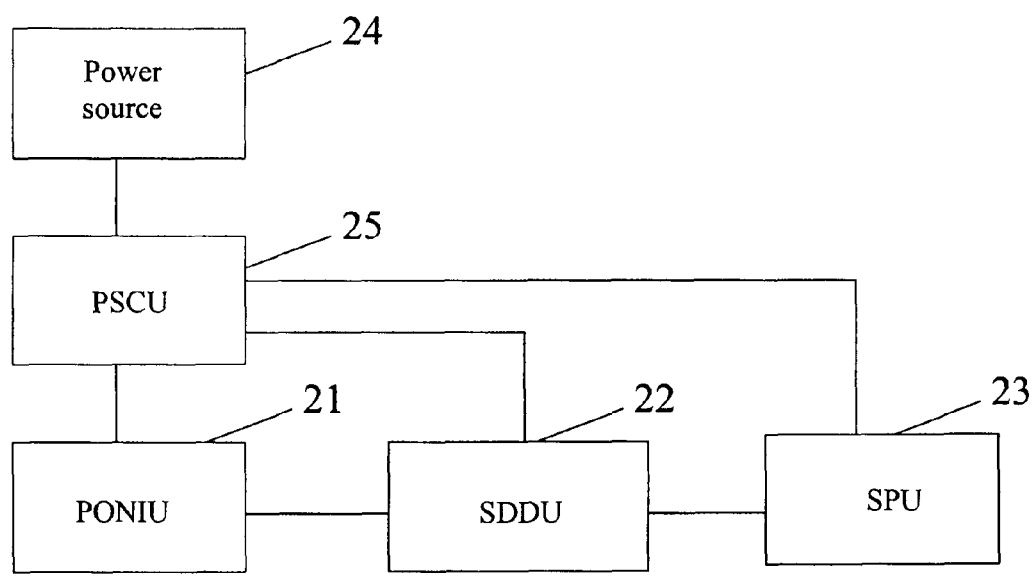
FIG. 2 is a schematic drawing illustrating the construction of one embodiment of a passive optical network user terminal of the embodiment of the present disclosure.

Referring to FIG. 2, a schematic drawing illustrates the main components of a PON user terminal of the embodiment of the present disclosure. As shown in FIG. 2, the PON user terminal of the embodiment of the present disclosure comprises a PONIU 21 for accessing the PON system, a SDDU 22 connected to the PONIU for distributing service data from the PON, and a plurality of SPUs 23 connected to the SDDU 22 for receiving and accordingly processing the service data distributed by the SDDU 22. In an embodiment, the SPUs can be video SPUs, voice SPUs, data access SPUs, wherein each SPU 23 provides a different service via a different type of interface, for example a cable television (CATV) coaxial cable interface, a telephone RJ45 interface, or an Ethernet port. The PON user terminal of the present disclosure further comprises a power source 24 for supplying power to individual units. Further, the PON user terminal of the present disclosure additionally comprises a PSCU 25 for controlling the activation and deactivation of the energy-saving power supply to the SPUs, SDDU, and PONIU, wherein the energy-saving power supply can disconnect or decrease the power supply to individual units.

It is found that most of the time a user only uses part of the services provided by the PON user terminal equipment. In addition, when the passive optical network user terminal is equipped with a backup power source, such as battery, the user can extend the time the backup power source can sustain the critical services by giving up some other services. The present disclosure achieves energy-saving power supply and hence reduces power consumption of the user terminal equipment by controlling the power supply to the individual SPUs, the SDDU, and the PONIU through the PSCU 25.

It should be noted that the activation and deactivation of the power supply to or the decrease of the power consumption of individual SPUs, the SDDU, and the PONIU of the present disclosure may be achieved by providing each unit with a power supply control switch so that control of the power supply to the individual units is possible by opening or closing the corresponding switch. The present disclosure may be implemented in other ways, for example, using a consolidated power supply control, that need not to be discussed in greater detail herein.

The following describes in details the PSCU 25 of the present disclosure. The PSCU 25 described herein controls the PON user terminal unit power supply in a number of ways comprising, for example, checking the individual units of the PON user terminal and determining if they enter the energy-saving power supply mode, and operation of the PON user terminal in the energy-saving mode. Also included are checking the individual units of the PON user terminal and determining if they exit from the energy-saving power supply mode, operation of the PON user terminal equipment after exiting from the energy-saving power supply mode, and interaction of the PON user terminal with the OLT equipment at the office end. In an embodiment of the energy-saving control according to the present disclosure, the usage state of the individual SPUs is first checked. Then, if it is determined that some of the SPUs are not used based on the result of such checking, the energy-saving power supply to these unused SPUs is activated, and if it is detected that use of these units is needed again, the energy-saving power supply to these units is deactivated.

Figure 3:
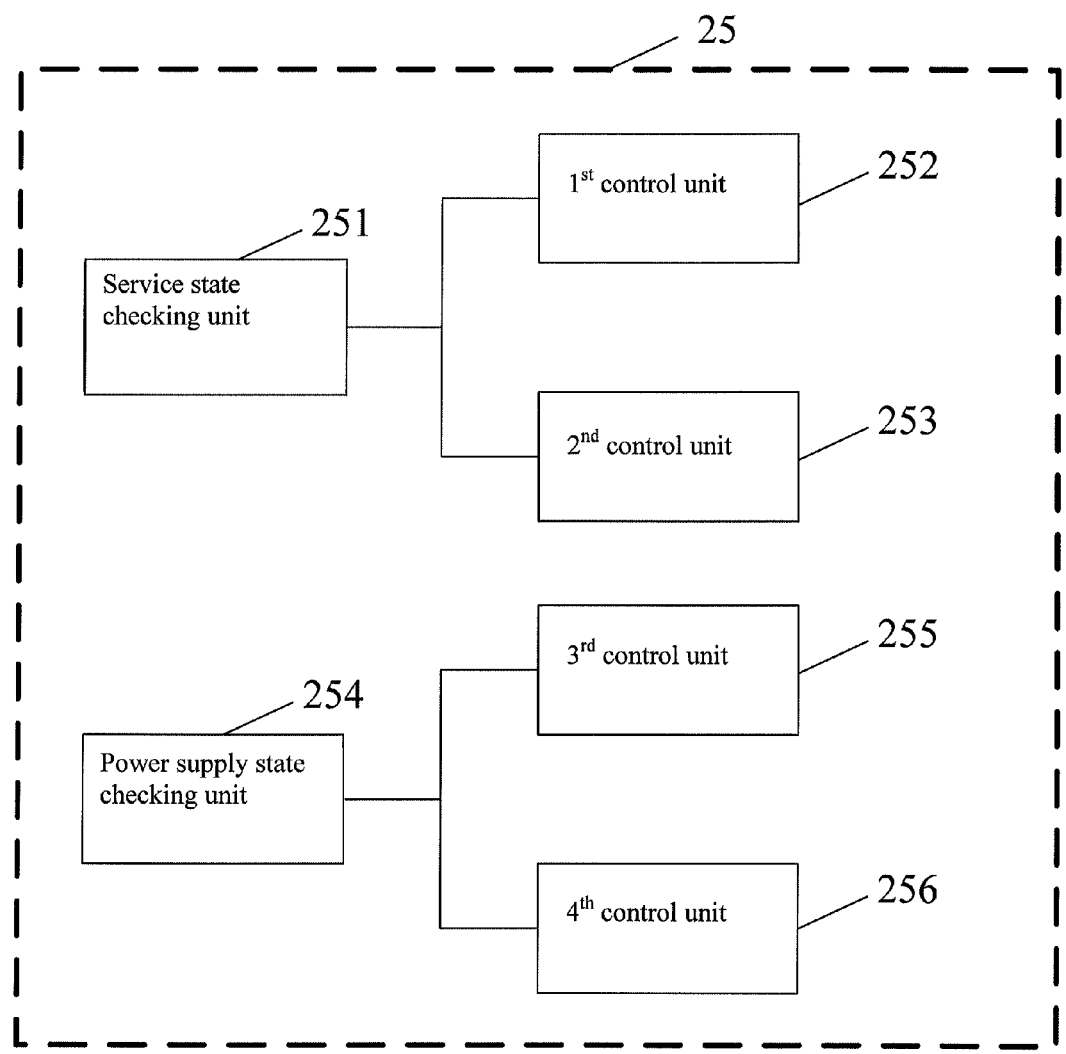
FIG. 3 is a schematic drawing illustrating an embodiment of the PSCU.

Referring to FIG. 3, the schematic drawing illustrates an optional embodiment of the PSCU 25 of the present disclosure. As shown in the drawing, the PSCU 25 in this embodiment comprises a service state checking unit 251 for checking the usage state of the individual SPUs by means of, for example, monitoring the state of the individual service interfaces. The PSCU 25 also comprises a first control unit 252, which, upon deciding that some SPUs are not used based on the result of the SPU state checking, activates the energy-saving power supply to these SPUs, and deactivates the energy-saving power supply to these SPUs once it detects that the use of these SPUs is needed again. Specifically, if, for example, it is detected that there is an absence of the link at the Ethernet port for user network access, that is, the network access line is disconnected or the network port traffic is 0, then the power supply to the network access service processing module is cut or the hardware chip of that module is set to the energy-saving mode to save some power. If, for example, it is detected that the user telephone is on hook, then the voice service processing module can be turned off to save power. The same process may be similarly applied to the conventional video services such as cable television. Furthermore, the present disclosure saves energy to a greater extent wherein, the usage state of individual SPUs is first checked, and then if it is determined that all SPUs are not used based on the result of such checking, the energy-saving power supply to all SPUs, the PONIU, and the SDDU is activated. If it is detected that use of a particular SPU is needed again, the energy-saving power supply to the needed SPU, PONIU, and SDDU is activated.

Referring to FIG. 3 again for more details, an embodiment of the PSCU 25 of the present disclosure may further comprise: a second control unit 253, which, upon determining that all SPUs are not in use based on the result of the SPU state checking, activates the energy-saving power supply to all SPUs, the PONIU, and the SDDU and, upon detecting that a SPU is needed, deactivates the energy-saving power supply to the needed SPU, the PONIU, and the SDDU.

In an embodiment, when it is detected that all services are not in use, that is all services are not being used, for example, the telephone is on hook, there is no link at the data service Ethernet port or the traffic is 0, and the CATV interface is not in use, the PON user terminal equipment can be put into a deeper power-saving mode. That is, all SPUs and the upstream PONIU, such as the optical-electrical conversion module, the Ethernet PON (EPON) media access control (MAC), the Gigabit PON (GPON) protocol processing module of the PON user terminal equipment are turned off, except for the operation of checking whether use of any of the SPUs in the power-saving mode is called again and the PON user terminal equipment is no longer communicating with the equipment at the office end, that is, it is off line. When it is detected that use of any of the SPUs is resumed, they are immediately recovered from the power-saving mode, in which case the upstream PONIU is reactivated and its connection with the equipment at the office end is reestablished. That is, passive optical networking allows a re-logon to the network in accordance with the PON protocol, and the SPUs are reactivated to provide services to the user.

In an embodiment according to the present disclosure, if the user terminal equipment has a backup power source, such as battery, for power supply, then the main power source and the backup power source may be checked more frequently, such that when it is detected that the main power source is disconnected and the backup power source is used, a power-saving strategy may be initiated. For example, only the service functions of highest priority, such as telephone voice service, are maintained and other services, for example network access and CATV services, are no longer provided. That is, the SPUs that are no longer providing services are turned off or power supply to these units are decreased to reduce power consumption to extend the life of the backup power source.

Referring to FIG. 3 again, in an embodiment of the present disclosure, the PSCU 25 further comprises a power supply state checking unit 254 for checking power supply state, and a third control unit 255, which, upon determining, based on the result of the power supply state checking, that the main power source is disconnected and the backup power source is providing power, chooses to activate the energy-saving power supply to some or all of the SPUs. In an embodiment, upon determining that a SPU is not in use based on the usage of services by the user, the third control unit 255 activates the energy-saving power supply to the unused SPUs, and upon detecting that use of the SPUs is needed again, deactivates the energy-saving power supply to these units.

In addition, the power-saving strategy of the present disclosure may be more flexible. For example, the power-saving strategy is initiated only when the discharge of the backup battery is below a preset value, or it alerts the user of the power supply usage through a display before it is initiated to allow the user to decide whether to enter power-saving mode. Referring to FIG. 3 again, in an embodiment, the PSCU of the present disclosure may further comprise a fourth control unit 256, which, upon determining that the discharge of the backup power source drops to a preset value based on the result of power supply state checking, chooses to activate the energy-saving power supply to some or all of the SPUs. In the above embodiment, once it is detected that a service interface is used again, for example, the phone is off hook, link or traffic is present at the network port, or the CATV port connection is activated, in other words, use of any SPUs is needed, the PON user terminal immediately exits from the power-saving mode and normal power supply is provided to the corresponding SPUs. If the SDDU and upstream PON interface unit are also in power-saving mode, then normal power supply will be provided to them as well to enable them to resume their normal functions.

In order to monitor the work state of each PON user terminal equipment for fault detection and diagnosis, the embodiment of the present disclosure allows the PON user terminals to report the power supply state to OLT at the office end.

Figure 4:
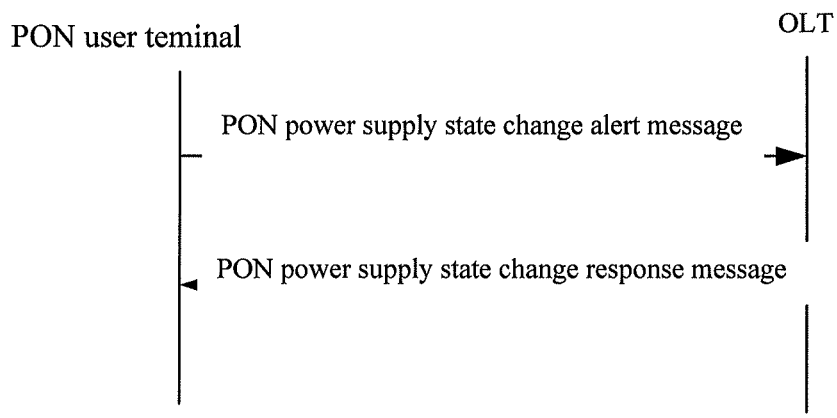
FIG. 4 is a schematic drawing illustrating one embodiment of the flow of reporting the state of power supply to a PON user terminal of the embodiment of the present disclosure.

Referring to FIG. 4, the schematic drawing depicts the flow of reporting the PON user terminal power supply state. The embodiment of the present disclosure allows the PON user terminal equipment to send a message, which may be called a power state change alert message herein, in a specific format to the equipment at the office end once it enters or exits from the power-saving mode or detects a disconnection of its main power supply. The OLT at the office end may record these events in a log and alert the maintenance personnel to take precaution and solve the user fault. Specifically, as shown in the drawing, the PON user terminal equipment will send a power supply state change alert message to OLT before implementing the actions of changing the power supply state of the related units. The OLT may optionally return a response message to the alert upon receiving the alert message, or may optionally not return a response message to the PON user terminal, but simply record the change of the power supply state of the PON user terminal.

Figure 5:
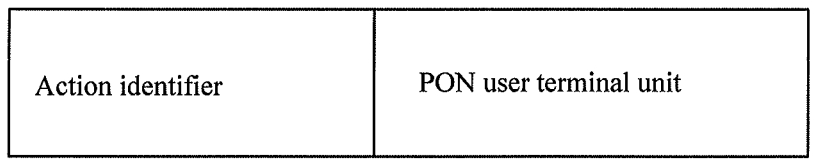
FIG. 5 is a schematic drawing illustrating one embodiment of the structure of the alert message indicating the power supply state change of the embodiment of the present disclosure.

Referring to FIG. 5 for more details, the alert message of the power supply state change of the PON user terminal comprises two parameter fields. The first field is the action identifier for the power supply state change, and comprises entering or exiting from power-saving mode. The second field is the identifier of the affected PON user terminal, such as data network access, voice, and CATV.

Upon receiving the power supply state change alert message from the PON user terminal, the OLT returns a response message to the PON user terminal. The response message comprises accepting or rejecting the indication of the power supply stage change of the PON user terminal unit, and accepting or rejecting the identifier of the PON user terminal unit whose power supply state has been changed. Upon receiving the response message from the OLT, the PON user terminal decides, based on the instructions carried by the response message, whether to implement the actions of changing the power supply state accordingly. Alternatively, the PON user terminal may immediately enter the corresponding power supply state upon sending the power supply state change alert message without having to wait for the instructions in the response message from the OLT. The OLT does not return any message to the PON user terminal after receiving the power supply state change alert of the PON user terminal, but simply records the change of the power-saving mode of the PON user terminal.

The sending of the alert message from the PON user terminal to the OLT may be implemented at different network layers, such as the multi-point control protocol (MPCP), the MAC, or the RS protocol layers, to adapt to the requirements of different PON standard protocols. For example, in the Ethernet passive optical network (EPON or Ethernet PON) standard protocol, the operation, administration, and maintenance (OAM) protocol extension can be used for the implementation. In the IEEE 802.3ah protocol specification (incorporated herein by reference), the OAM Organization Specific Information TLV is used in which the format of the control message is defined in the Organization Specific Value field following the definition of the Organizationally Unique Identifier (OUI) field, so that carrying of the above alert or response control messages can be implemented at the EPON OAM protocol layer. The OAM Organization Specific Information TLV is discussed in IEEE Draft P 802.3ah/D3.3, Paragraph 57.5.2.3, which is incorporated herein by reference.

Figure 6:
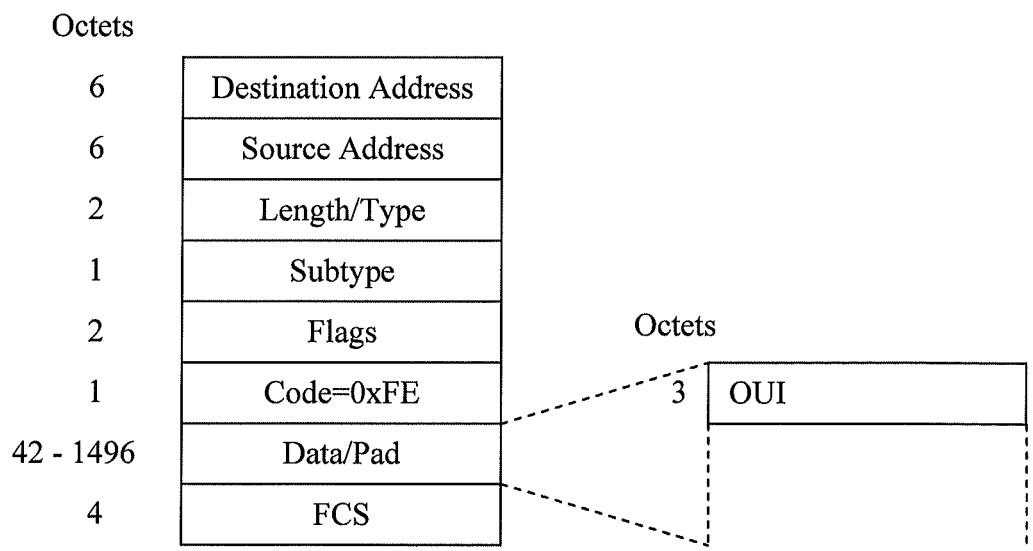
FIG. 6 is one embodiment of a frame structure of an OAM extension.

Referring to FIG. 6 for details, the OAM manufacturer extended frame structure is described in the IEEE 802.3ah protocol in which, once the three-byte, manufacturer identified OUI field is filled in, the subsequent data fields can be defined, for example, in the format as shown in FIG. 5. In the gigabit passive optical network (GPON or Gigabit PON) protocol standard, the physical layer operation administration maintenance (PLOAM) or ONT management and control interface (OMCI) extension can be used for implementation in which a message identifier, which is added according to the ITU-T G.984.3 (incorporated herein by reference) protocol extension, is used to transport the user-defined message of FIG. 5.

The above are only examples of the preferred embodiments of the present disclosure and are not intended to limit the disclosure. Any modifications, equivalent substitutions, and improvements made to the present disclosure without departing from the spirit and principles thereof should be encompassed within the scope thereof.

What is claimed is:

1. A passive optical network (PON) component, comprising:
   a plurality of service processing units configured to process service data;
   a service state checking unit configured to monitor usage of the plurality of service processing units;
   a power supply control unit configured to activate an energy-saving power supply mode on at least one service processing unit when the at least one service processing unit is not in use;
   wherein the PON component sends an alert message to an optical line terminal (OLT) when the at least one service processing unit of the PON component enters an energy-saving power supply mode, the alert message comprises an identifier of the PON component and an action identifier that indicates an operation of entering the energy-saving power supply mode.

2. The PON component of claim 1, wherein the PON component further receives a reply message from the OLT as a response to the alert message.

3. The PON component of claim 1, further comprising:
   a power source comprising a main power supply provided by a user premises, and a backup power supply being a battery installed in the PON component.

4. The PON component of claim 3, wherein the power supply control unit is further configured to activate the energy-saving power supply mode to at least one of the service processing units when the main power source is disconnected and the backup power source is providing power.

5. The PON component of claim 3, wherein the power supply control unit is further configured to activate the energy-saving power supply mode to at least one of the service processing units when the backup power source drops to a preset level.

6. A method comprising:
   checking a usage state of each of service processing units in a passive optical network (PON) user terminal;
   activating an energy-saving power supply mode on at least one service processing unit upon determining that the at least one service processing unit is not in use; and
   sending an alert message to an optical line terminal (OLT) when the at least one service processing unit of the PON user terminal enters an energy-saving power supply mode, wherein the alert message comprises an identifier of the PON user terminal and an action identifier that indicates an operation of entering the energy-saving power supply mode.

7. The method of claim 6, wherein the PON user terminal comprises a main power supply provided by a user premises and a backup power supply being a battery installed in the PON user terminal.

8. The method of claim 7, further comprising:
   activating the energy-saving power supply mode to at least one of the service processing units, when the main power source is disconnected and the backup power source is providing power.

9. The method of claim 7, further comprising:
   activating the energy-saving power supply mode to at least one of the service processing units when the backup power source drops to a preset level.

10. A method comprising:
activating an energy-saving power supply mode on an optical network unit (ONU) in responsive to detection of inactivity at a service processing unit in the ONU; and
sending an alert message to an optical line terminal (OLT) to alert the OLT of a power supply state change in the ONU when the ONU enter the energy-saving power supply mode;
wherein the alert message comprises an identifier of the ONU that enters the energy-saving power supply mode, and an action identifier that indicates an operation of entering the energy-saving power supply mode.

11. The method of claim 10, wherein the action identifier identifies which of a plurality of service processing units within the ONU had a power supply state change.

12. The method of claim 11, wherein the ONU comprises a main power supply provided by a user premises and a backup power supply being a battery installed in the PON user terminal.

13. The method of claim 12, further comprising:
activating the energy-saving power supply mode to at least one of the service processing units when the backup power source drops to a preset level.

14. The PON component of claim 1, wherein the PON component is a PON user terminal, and the plurality of service processing units comprises a video service processing unit, a voice service processing unit and a data access service processing unit that are internal units within the PON user terminal.

15. The PON component of claim 14, wherein the alert message is a power state change alert message for indicating entering of the energy-saving power supply mode, and the alert message comprises information of which of the plurality of service processing units enters the energy-saving power supply mode.

16. The PON component of claim 1, further comprising a power source comprising a main power supply provided by a user premises, and a backup power supply being a battery installed in the PON component;
wherein the main power supply is functional when the at least one service processing unit of the PON component enters the energy-saving power supply mode.

17. The PON component of claim 2, the reply message comprises instruction of accepting or rejecting the PON component to enter the energy-saving power supply mode;
wherein the PON component controls the at least one service processing unit to deactivate the energy-saving power supply mode when the response message comprises instruction of rejecting the PON component to enter the energy-saving power supply mode.

18. The method of claim 6, wherein the plurality of service processing units comprises a video service processing unit, a voice service processing unit and a data access service processing unit that are internal units within the PON user terminal, and wherein the alert message comprises information of which of the plurality of service processing units enters the energy-saving power supply mode.

* * * * *